(12) United States Patent
Madson et al.

(10) Patent No.: US 8,714,956 B2
(45) Date of Patent: May 6, 2014

(54) MOLD FRAMES AND CAVITIES FOR MAKING DIMPLED GOLF BALLS

(71) Applicant: Acushnet Company, Fairhaven, MA (US)

(72) Inventors: Michael R. Madson, Pawtucket, RI (US); Nicholas M. Nardacci, Bristol, RI (US); Mark R. Verronneau, Acushnet, MA (US); Thomas L. Mydlack, Rochester, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/019,814

(22) Filed: Sep. 6, 2013

(65) Prior Publication Data

US 2014/0004217 A1    Jan. 2, 2014

Related U.S. Application Data

(62) Division of application No. 12/898,449, filed on Oct. 5, 2010, now Pat. No. 8,529,816.

(51) Int. Cl.
    *B29C 43/18*    (2006.01)

(52) U.S. Cl.
    USPC .......................................... 425/116; 425/195

(58) Field of Classification Search
    USPC .................................. 425/116, 195; 264/279.1
    See application file for complete search history.

(56) References Cited

U.S. PATENT DOCUMENTS

| | | | |
|---|---|---|---|
| 2,376,085 A | 5/1945 | Radford | |
| 3,147,324 A | 9/1964 | Ward | |
| 4,558,499 A | 12/1985 | Brown | |
| 4,560,168 A | 12/1985 | Aoyama | |
| 4,960,281 A | 10/1990 | Aoyama | |
| 5,006,297 A | 4/1991 | Brown et al. | |
| 5,334,673 A | 8/1994 | Wu | |
| 5,725,891 A | 3/1998 | Reid, Jr. | |
| 5,733,428 A | 3/1998 | Calabria et al. | |
| 5,795,529 A | 8/1998 | Reid, Jr. | |
| 6,132,324 A | 10/2000 | Hebert et al. | |
| D442,978 S | 5/2001 | Marshall | |
| 6,315,915 B1 | 11/2001 | Hebert et al. | |
| 6,439,873 B1 | 8/2002 | Marshall | |
| 6,644,948 B2 | 11/2003 | Mydlack et al. | |
| 6,749,525 B2 | 6/2004 | Aoyama | |
| 7,223,181 B2 | 5/2007 | Dewanjee et al. | |
| 7,246,937 B2 | 7/2007 | Verronneau et al. | |
| 7,422,529 B2 | 9/2008 | Aoyama et al. | |
| 7,473,195 B2 | 1/2009 | Aoyama et al. | |
| 7,490,975 B2 | 2/2009 | Puniello et al. | |
| 7,520,741 B2 | 4/2009 | Wilson et al. | |
| 7,618,333 B2 | 11/2009 | Nardacci et al. | |
| 7,648,667 B2 | 1/2010 | Brum | |
| 7,655,171 B2 | 2/2010 | Puniello et al. | |
| 2008/0020081 A1 | 1/2008 | Wilson et al. | |
| 2008/0203615 A1 | 8/2008 | Brum | |
| 2009/0166924 A1 | 7/2009 | Kuttappa | |
| 2010/0113187 A1 | 5/2010 | Nardacci et al. | |

*Primary Examiner* — Robert B Davis
(74) *Attorney, Agent, or Firm* — Daniel W. Sullivan

(57) ABSTRACT

Universal mold frames for producing multi-piece golf balls are provided. The mold frames include lower and upper frame plates having locator pins that are inserted into corresponding locator slots in the mold cavities. The eccentric pin layout of the frame plates and corresponding slots in the cavities means the cavities can be fitted easily and aligned in the frame plates. The interior surfaces of the mold cavities define a specific dimple pattern such as icosahedron or tetrahedron-based patterns. The mold frames can accommodate cavities having different dimple patterns. A castable liquid polymer, for example, polyurethane is dispensed into the mold cavities, which are then pressed together to form the spherical cover for the ball.

11 Claims, 12 Drawing Sheets

MOLD FRAMES AND CAVITIES FOR MAKING DIMPLED GOLF BALLS

CROSS-REFERENCE TO RELATED APPLICATIONS

This application is a divisional of co-assigned U.S. patent application Ser. No. 12/898,449 having a filing date of Oct. 5, 2010, now U.S. Pat. No. 8,529,816, the entire disclosure of which is hereby incorporated herein by reference.

BACKGROUND OF THE INVENTION

1. Field of the Invention

The present invention is directed generally to mold frames for producing multi-piece solid golf balls. In general, such balls contain an inner core and outer cover with one or more intermediate layers disposed between the core and cover. The mold frames include lower and upper frame plates containing mold cavities. The interior surfaces of the mold cavities define a specific dimple pattern for the surface of the ball. A castable liquid polymer, for example, polyurethane is dispensed into the mold cavities, which are then pressed together to form a spherical cover for the ball.

2. Brief Review of the Related Art

Manufacturers produce golf balls having a wide variety of dimple patterns. Different dimple shapes, sizes, and geometric patterns are used to modify aerodynamic properties of the ball. The dimples affect the lift, drag, and flight stability of the ball. When a golf ball is struck efficiently with the club face, it will spin about a horizontal axis and the interaction between the dimples and oncoming air stream will produce the desired lift, drag, and stability. Various dimple patterns are used to create a ball that can travel long distances and have good flight trajectory when struck by a club.

Forming the dimpled cover layers for golf balls involves several steps. Mold cavities having select dimple profiles are used to manufacture the balls. The mold cavities have slight protrusions machined into their interior surfaces and these peaks/valleys form the dimple pattern on the surface of the ball. In large scale production operations, thousands of balls are produced daily. It is important the dimples be formed consistently on the ball surfaces. The dimensions and geometries of the dimples must be identical for each ball being produced on a given assembly line. In turn, the dimple profiles of the mold cavities used to produce these balls must be precisely detailed and accurate.

In the past, compression molding frames containing bores and channels which penetrated through rows of mold cavities were used to form the ball covers. The golf ball cores were placed in mold cavities that were loaded into the frames. Half-shells of the cover material such as balata or ethylene-based ionomer resins were placed in the cavities. Then, a thermal medium such as steam was fed into the bores and channels to melt the cover material. The resulting balls were cooled with cold water and then unloaded from the mold. Brown, U.S. Pat. No. 4,558,499; Reid, Jr., U.S. Pat. No. 5,725,891; and Reid, Jr., U.S. Pat. No. 5,795,529 disclose such thermal/cooling mold frames.

In recent years, mold cavities containing a castable liquid polymer that are placed in a mold frame have been used for molding the cover material. In these methods, a castable polymer material such as polyurethane or polyurea is mixed and dispensed into the mold cavities For example, Hebert et al., U.S. Pat. No. 6,132,324 discloses a method of forming a multi-layered golf ball comprising a core, inner cover layer, and outer cover layer. The core of the golf ball is formed and then an inner cover is injection-molded over the core to form a golf ball subassembly (core and inner cover). Two mold cavities are used, an upper mold cavity and lower mold cavity. Each mold cavity is approximately one-half of the size of a finished ball. The mold cavities have interior walls with details defining the dimple pattern of the resulting ball. A castable polyurethane material is introduced into the mold cavities and then the ball subassembly is placed in one cavity.

Next, the upper and lower mold cavities are joined together under sufficient heat and pressure to form an internal spherical-shaped cavity. The polyurethane material in the cavities encapsulates the ball subassembly and forms the cover of the ball. As noted above, the mold cavities, which are pressed together, contain slight protrusions representing the negative image of the dimple pattern that will be produced on the finished ball. The mold cavities are held together until the polyurethane cover material is cooled, and then the cavities are opened to remove the ball.

Referring to FIG. 1, a golf ball mold (10) of the prior art used to form a traditional cover layer over a core (or ball subassembly) is generally shown. The mold (10) includes hemispherical mold cavities (12) and (14) having interior dimple patterns (12a) and (14a). When the mold cavities (12, 14) are mated, they define an interior spherical cavity (16) to form the cover for the ball. The mold cavities (12, 14) are mated together along a parting line (17) that creates an equator or seam for the finished ball. In recent years, mold cavities with non-planar mating surfaces have been used to create a golf balls having a staggered parting line. For example, Nardacci et al., U.S. Pat. No. 7,618,333 discloses a method for making golf balls having a staggered parting line. The upper and lower mold cavities have non-planar mating surfaces. When the cavities are mated, the parting line follows the dimple outline pattern and allows the dimple outline pattern of one mold cavity to interdigitate with the dimple outline pattern of the mating mold cavity, thereby forming a golf ball without an obvious parting line.

In FIG. 1A, the mold cavity (14) is shown in further detail. The mold cavity (14) includes a dimple pattern (14a) and locator slot (18) that fits over a locator pin on a mold frame (not shown) when the mold cavity (14) is inserted into the frame. In conventional molding operations, the upper and lower mold cavities normally have the same design. That is, a given mold cavity may be used in either the upper or lower mold frame. These "single-design" cavities may be used interchangeably in the upper and lower mold frames. Fabricating single-design cavities minimizes manufacturing time and cost; improves part consistency; and makes assembly of the mold frame easier. Each mold cavity has a hemispherical structure and contains one-half of the dimple patterns. When the two mold cavities are pressed together, they produce a complete dimple pattern on the ball's cover.

Referring to FIGS. 2 and 3, the mold cavities (12, 14) are placed in traditional lower and upper mold frame plates (20, 30). In FIG. 2, a conventional lower mold frame plate (20) is shown. The frame plate (20) includes four circular recessed portions (22a, 22b, 22c, and 22d) for receiving four mold cavities (14). Each recess includes a locator pin (24a, 24b, 24c, and 24d) for inserting into locator slots arranged in the mold cavities. The frame plate (20) further includes threaded bores (25a, 25b, 25c, and 25d) for receiving bolts (not shown) so that the lower and upper plates (20, 30) can be clamped together. In addition, the frame plate includes two cut-out cavity hold areas (26, 27) for placing a retainer washer. This retainer helps to secure the mold cavities in place and keep them level after being placed in the mold frame. Alignment holes (28, 29) are located in corners of the lower frame plate (20). Guide pins in the upper frame plate (30) are inserted into the alignment holes (28, 29) to facilitate attachment of the upper plate (30) to the lower plate (20).

In order to maintain the dimple pattern design and provide a staggered parting line, there needs to be a certain rotation angle (α) between the mold cavities (12, 14). Conventional mold frames provide the proper rotation angle (α) between lower and upper mold cavities by way of locator pins. These pins are located in select areas of the lower and upper mold frames. The locator pins are inserted into the locator slots of the mold cavities to secure the cavities in place. The locator pins/slots ensure the mold cavities are correctly aligned. In particular, the mold cavity (14) shown in FIGS. 1 and 1A can be rotated 42°, 114°, 186°, 258° or 330° (counter-clockwise direction) so that it is properly aligned with the opposing mold cavity. In the mold frame, however, it is desirable to maintain the locator pins towards the center of the mold frame to ensure positive cavity alignment; thus, rotation angle (α) values of 330° and 42° are used.

In FIG. 3, a conventional upper mold frame plate (30) is shown. As discussed above, the frame plate (30) includes four circular recessed portions (32a, 32b, 32c, and 32d) for receiving four mold cavities (12). Each recess includes a locator pin ((34a, 34b, 34c, and 34d) for inserting into the locator slots of the mold cavities. The frame plate (30) further includes threaded bores (35a, 35b, 35c, and 35d) for receiving bolts (not shown) so the lower and upper plates (20, 30) can be clamped together. In addition, there are two cut-out cavity hold areas (36, 37) for placing a retainer washer. Guide pins (38, 39) are inserted into the slots (28, 29) of the lower frame plate to register the upper and lower frame plates.

As discussed above, the mold cavities (12, 14) have the same design. Thus, the mold cavity (12) can be placed in either the lower or upper frame plate. Likewise, the mold cavity (14) can be placed in either the lower or upper frame plate. This single cavity design is desirable because it means the mold cavities (12, 14) can be used interchangeably in the upper and lower mold frame plates (20, 30). On the other hand, this configuration may lead to problems with accurately positioning the mold cavities in the mold frames to produce certain dimple layouts. Particularly, because any slot in a mold cavity can be fitted with any locator pin in any frame plate, this may lead to the cavities being placed in the wrong position. As a result, the desired dimple pattern may not be created on the surface of the ball.

In the lower frame plate (20) (FIG. 2), a single pin (24a-d) is located on each circular recess of the plate. The pins are located at 330° and 42° from a vertical axis. Meanwhile, the upper frame plate (30) (FIG. 3) has a single pin (34a-d) located on each circular recess, each pin being arranged on the vertical axis. Thus, the mold cavity (12, 14) must be positioned on either frame (20, 30) so the slots of the mold cavity are aligned with and fit over the pins. This mold frame design is generally well suited for molding golf balls having a modified-icosahedron dimple layout. That is, this configuration of the lower and upper frame plates (20, 30) is generally effective when each mold cavity (12, 14) has a modified-icosahedron dimple pattern. However, this mold frame configuration is generally ineffective for other dimple patterns.

For example, FIG. 4 shows a conventional mold cavity (40) for producing a dimple layout based on a tetrahedral geometric pattern (42). This mold cavity (40) includes three identically-sized locator slots (45a, 45b, and 45c). For this dimple pattern, the cavities must be assembled in the frames such that:

Slot (45a) mates with the pins located at the rotation angle (α) of 330° on the lower frame plate (20);

Slot (45b) mates with the pin located in the upper frame plate (30); and

Slot (45c) mates with the pins located at the rotation angle (α) of 42° on the lower frame plate (20).

That is, any slot in the mold cavity can be aligned with any locator pin in any frame plate. Since any slot can fit over any locator pin, it is possible the correct slot may not be fitted with the correct pin. This is particularly a problem when an operator in the production line is not familiar with the dimple pattern layout and inserts the mold cavity in the wrong position. If a mold cavity is placed in the frame so that a given slot is fitted improperly over a locator pin, this will cause the lower and upper mold cavities to misalign. Improperly aligned lower and upper mold cavities can damage the mold cavities resulting in golf ball defects. Thus, there is a need for a mold frame having a more robust and accommodating structure. The mold frame needs to be able to accommodate mold cavities having various dimple layouts and prevent or minimize the likelihood of misaligned mold cavities. In addition, the mold frame needs to be accommodating to single-design mold cavities. That is, a given mold cavity needs to able to fit in the upper and lower mold frames. The present invention provides a mold frame having these features along with a method of molding golf balls using this frame. These and other objects, benefits, and advantages of the invention are evident from the following description and illustrated embodiments.

SUMMARY OF THE INVENTION

The present invention relates to universal mold frames that can hold mold cavities for molding multi-piece golf balls. The mold frames comprise lower and upper frame plates having multiple annular recesses for receiving mold cavities. In one embodiment, the lower frame plate contains recesses with at least two locator pins arranged thereon. And, the corresponding upper frame plate contains recesses with at least one locator pin arranged thereon. The locator pins are inserted into corresponding locator slots in the mold cavities. The eccentric pin layout of the frame plates and corresponding slots in the cavities means the cavities can be fitted easily and aligned in the frame plates. Each mold cavity has an arcuate inner surface defining an inverted dimple pattern, preferably icosahedron or tetrahedron-based patterns. The mold frames can accommodate cavities having different dimple patterns. A castable liquid polymer, for example, polyurethane is dispensed into at least one mold cavity. A golf ball sub-assembly is loaded in the mold cavity. The lower and upper frame plates are attached together, thus mating the respective mold cavities under compressive force. In this manner, a spherical cover is formed over the ball sub-assembly. Later, the lower and upper frame plates are detached and the molded golf ball is removed from the cavities.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

The present invention relates generally to a mold frame comprising a lower frame plate and upper frame plate. Each frame plate contains recessed portions for holding mold cavities (otherwise referred to as "half-molds" or "mold cups".) In operation, these mold cavities are filled with castable polymeric material and joined together under compressive force to form a spherical cover for the golf ball.

Mold Frame

Figure 1:
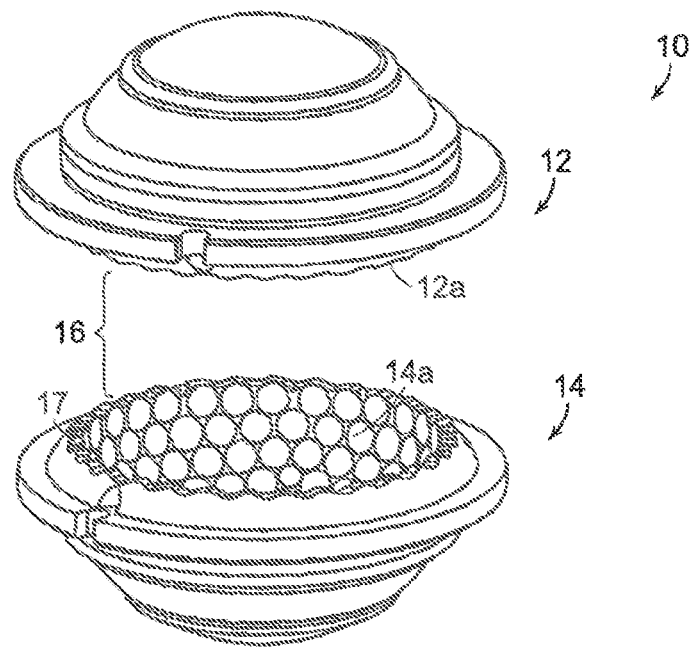
FIG. 1 is a perspective view of upper and lower mold cavities of the prior art.
Figure 1A:
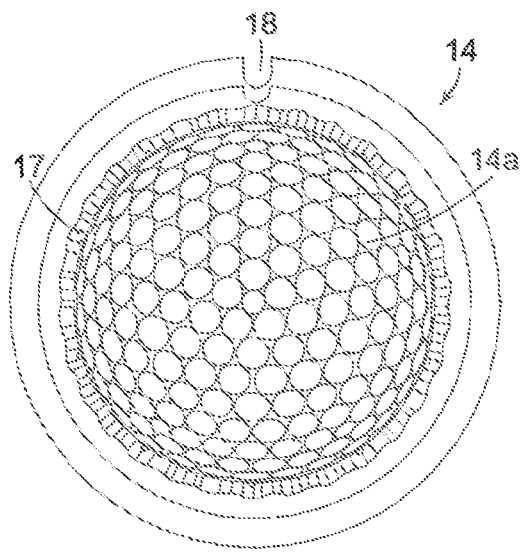
FIG. 1A is a planar view of the lower mold cavity shown in FIG. 1.
Figure 2:
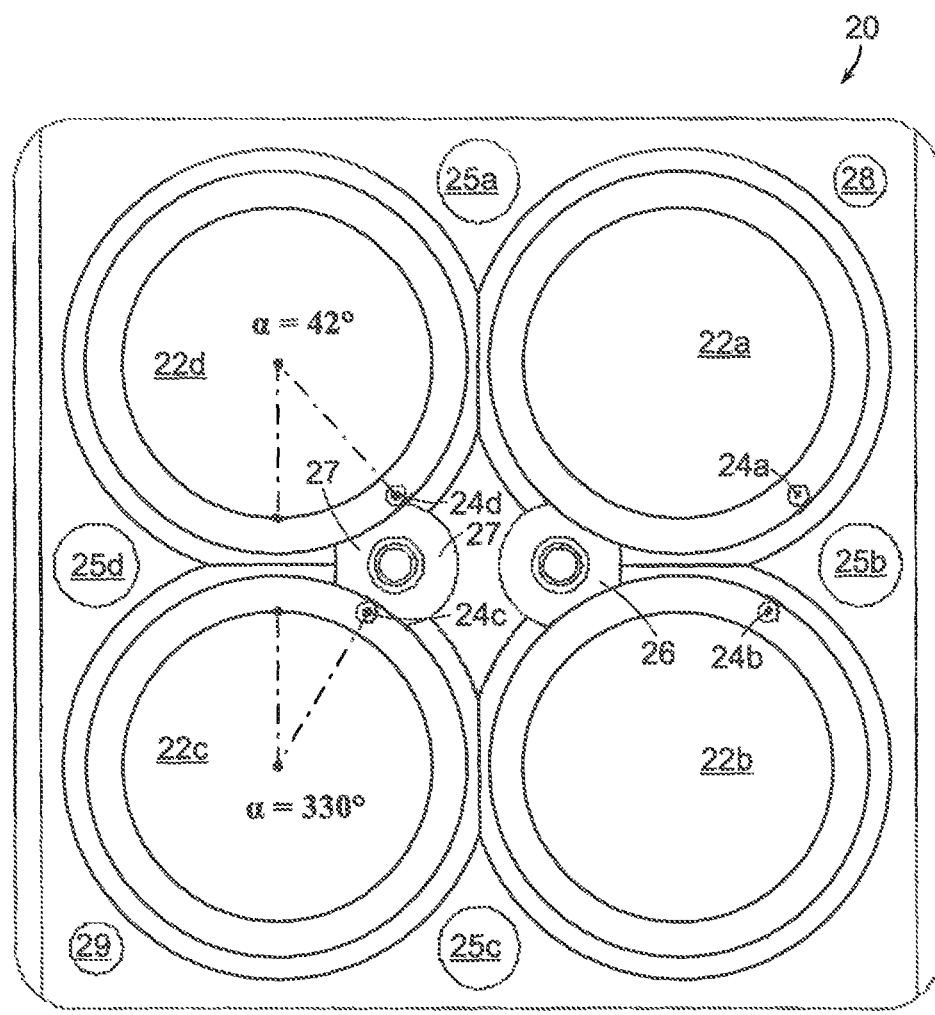
FIG. 2 is a planar view of a lower mold frame plate of the prior art.
Figure 3:
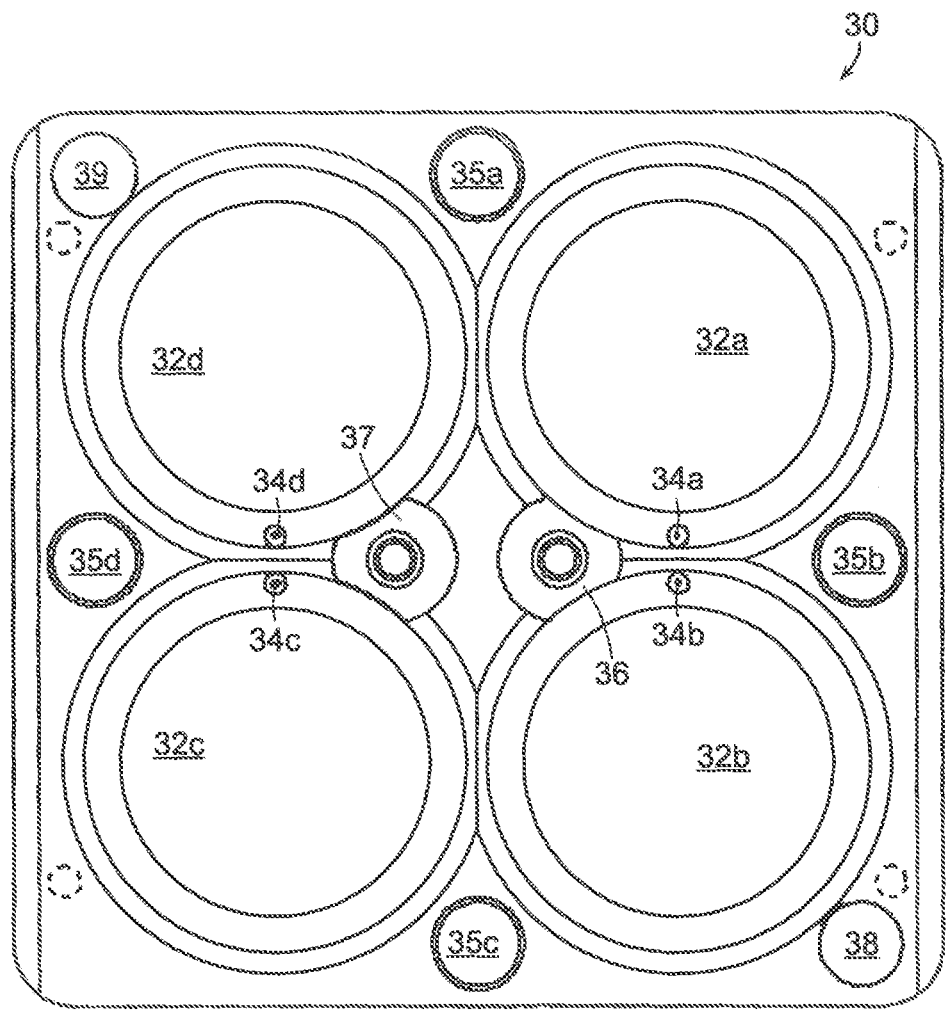
FIG. 3 is a planar view of an upper mold frame plate of the prior art.
Figure 4:
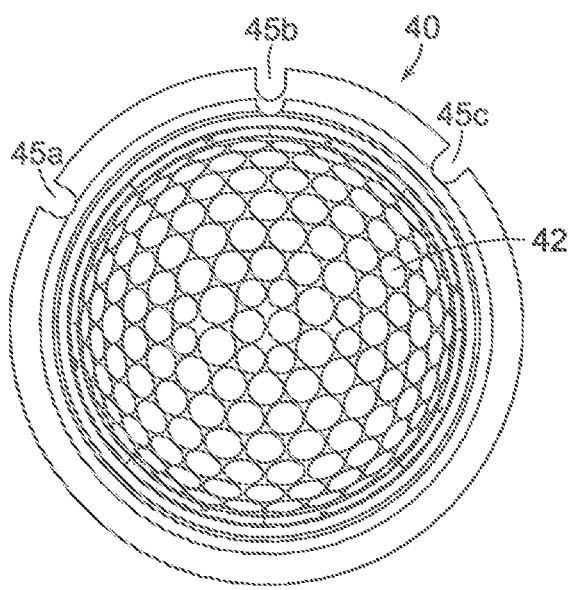
FIG. 4 is a planar view of a mold cavity of the prior art having a tetrahedral-based dimple pattern.
Figure 5:
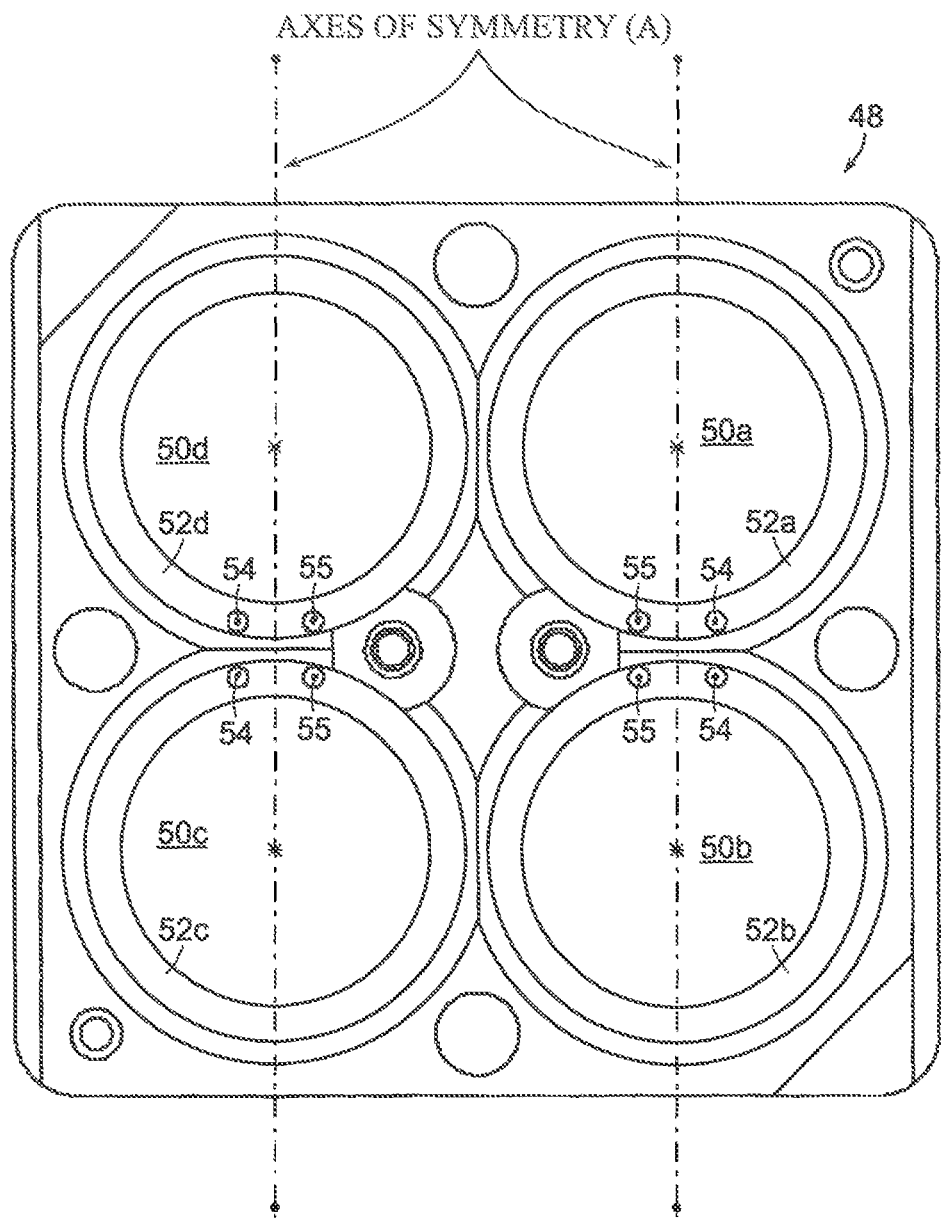
FIG. 5 is a planar view of one embodiment of a lower mold frame plate of the present invention.

Referring to the drawings, FIG. 5 illustrates one embodiment of a mold frame plate (48) of the present invention. This frame plate (48) is referred to as the "lower" frame plate and the corresponding frame plate (60) (FIG. 7) is referred to as the "upper" frame plate herein for purposes of describing the position of the plates based on one perspective. It should be understood the terms, "lower", "upper", "top", "bottom", "right', "left", and the like are arbitrary terms used to refer to one position of an element based on one perspective and should not be construed as limiting the scope of the invention. The lower frame plate (48) includes multiple annular recesses (50a, 50b, 50c, and 50d) for receiving the mold cavities (not shown). Each recessed area contains an annular rim (52a, 52b, 52c, and 52d) having at least two locator pins (54, 55). As discussed further below, the locator pins are inserted into corresponding slots of the mold cavities.

Although the mold frame plates are described primarily herein as containing four recessed portions for receiving four lower half-molds, it should be understood that the mold frame plates may be constructed so as to contain any suitable number of half-molds. For example, each mold frame plate may be outfitted with recessed areas for only two half molds. In another embodiment, for example, each frame plate may contain eight half-molds.

Furthermore, the mold frame plates are described primarily herein as containing two locator pins in the lower frame, a single locator pin in the upper frame. The mold cavities are described primarily herein as containing three locator slots. It should be understood that the frame plates and mold cavities may have other configurations in accordance with this invention.

Figure 6:
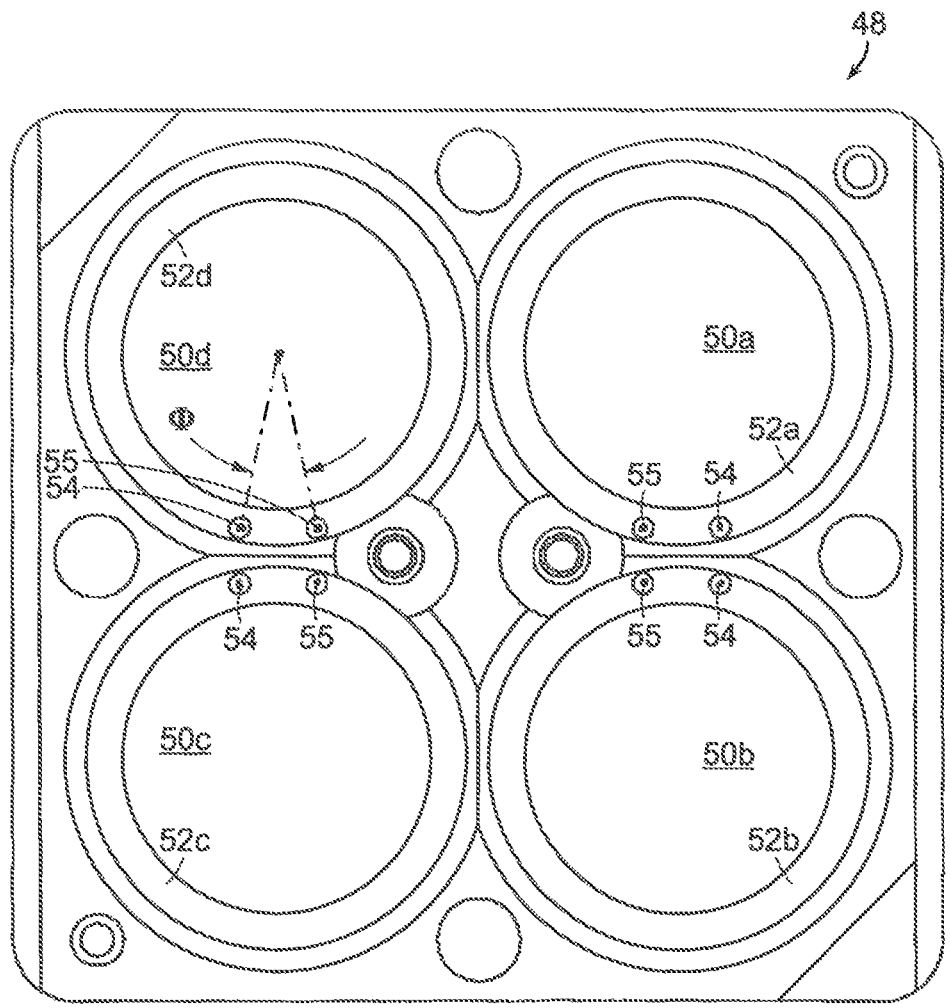
FIG. 6 is a planar view of the lower mold frame plate of FIG. 5 showing the pin separation angle.

In FIG. 5, the lower frame plate (48) includes multiple annular recesses (50a-d), each equipped with two locator pins (54, 55). The pins are symmetric about an axis (A) that intersects the center of the cavities. The pins have the same diameter (dp) defined by the following relationship: dp≤0.125 inches. Referring to FIG. 6, the two identical locator pins (54, 55) are separated by an angle (φ) defined by the following relationship: 10°≤φ≤45°. More preferably, the separation angle (φ) falls within the following range: 20°≤φ≤30°. Preferably, the separation angle for each set of locator pins (54, 55) arranged in the frame is identical.

Figure 7:
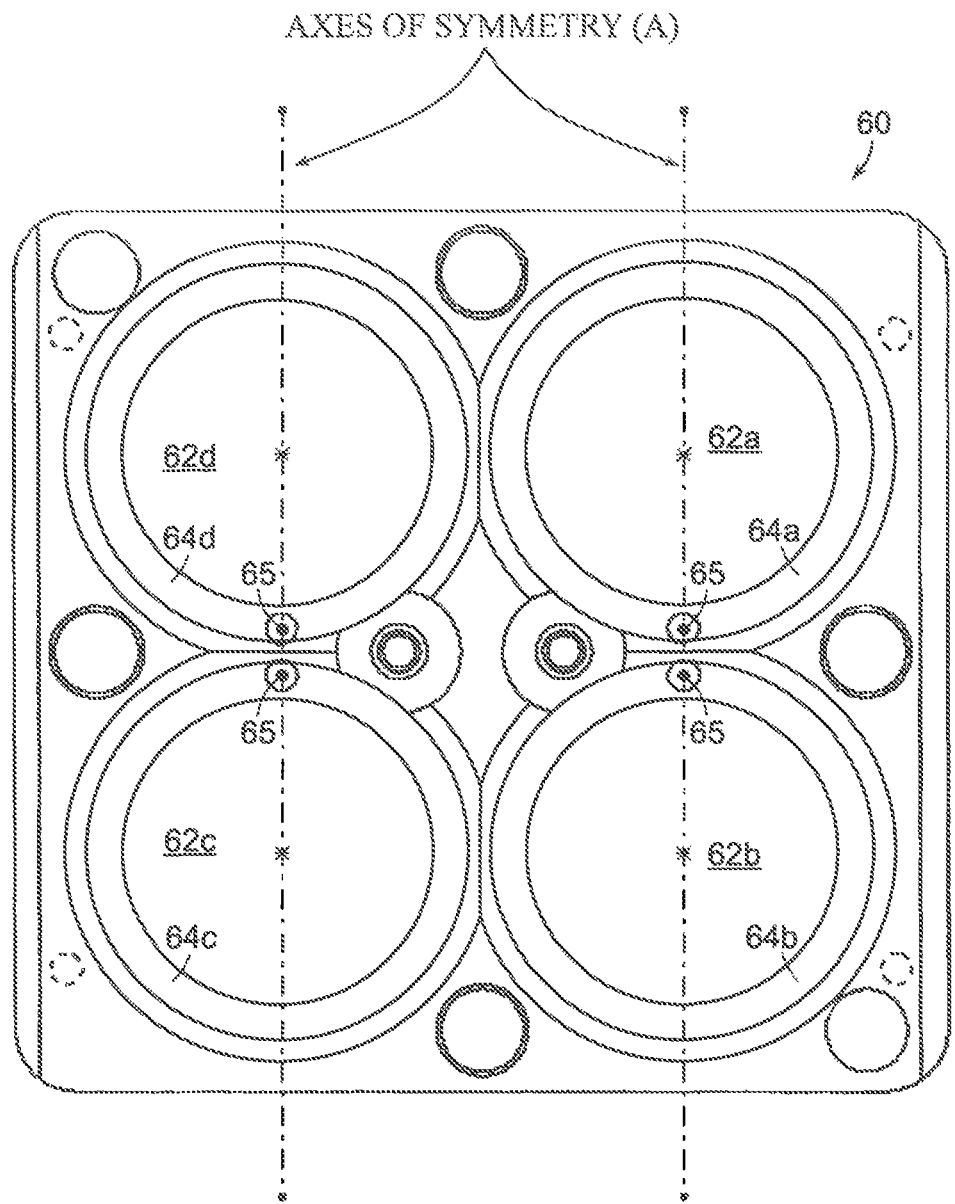
FIG. 7 is a planar view of one embodiment of an upper mold frame plate of the present invention.

Referring to FIG. 7, one embodiment of the upper frame plate (60) of the present invention is shown. The upper frame plate (60) includes multiple annular recesses (62a, 62b, 62c, and 62d), wherein each recess includes a rim (64a, 64b, 64c, and 64d) equipped with a single locator pin (65). The pin (65) is located on the axis that intersects the center of the annular recesses (62a-d). This is the same axis of symmetry in the lower frame plate (48) described above. Keeping the pins in the same location on both the lower and upper frame plates allows for maximum separation of the locator slots in the mold cavities. The two locator pins (54, 55) arranged on each annular rim in the lower frame plate (48) have a relatively small diameter, and the single locator pin (65) arranged on each annular rim in the upper frame plate (60) has a relatively large diameter. That is, the single locator pins (65) in the upper frame plate (60) are generally oversized. More particularly, the relationship of the diameter (dp) of the two locator pins (54, 55) in the lower frame plate (48) and diameter (Dp) of the single locator pin (65) is defined according to the following relationship: dp<Dp≤1.25dp, and more preferably by the relationship: 1.25dp<Dp≤1.75dp.

Figure 8:
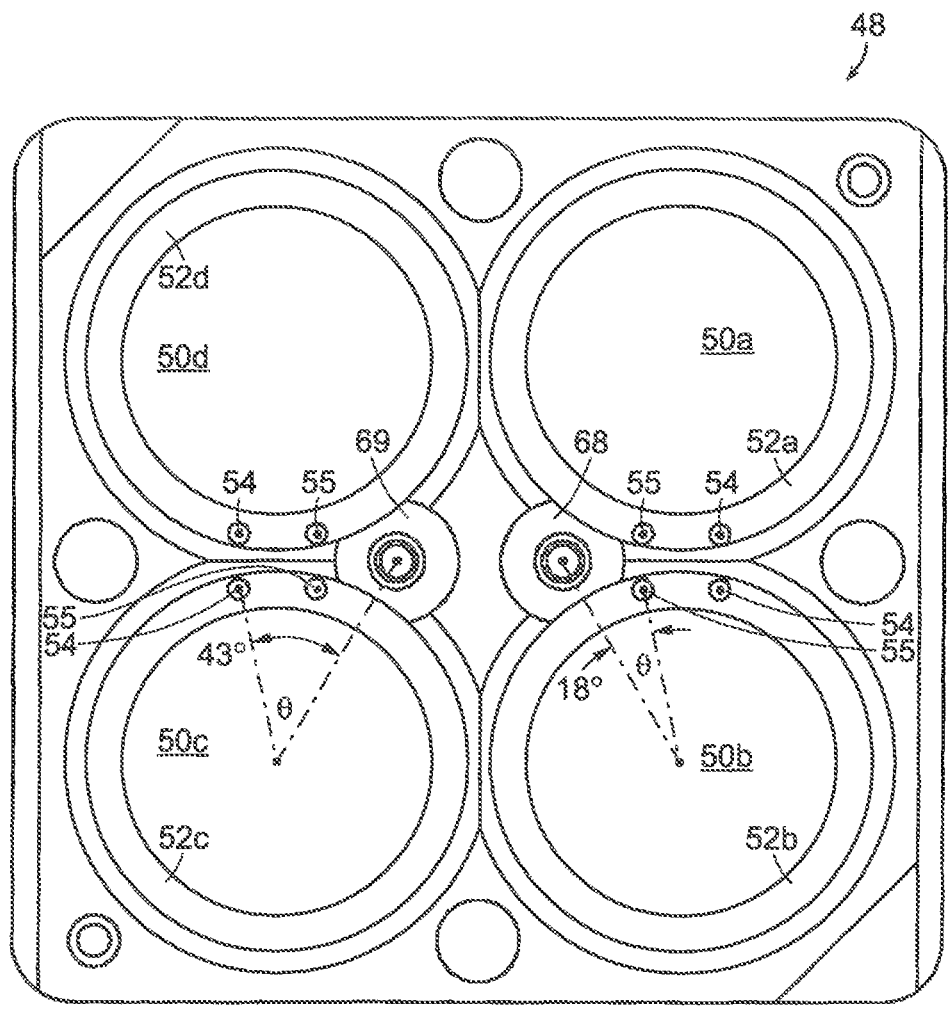
FIG. 8 is a planar view of one embodiment of a lower mold frame plate of the present invention showing the proximity angle between the locator pin and cavity hold area.

As shown in FIG. 8, the mold frame plate (48) contains two cut-out cavity hold areas (68, 69) for placing a retaining means (not shown) to help secure the mold cavities in place. The cut-out, recessed areas (68, 69) are located on an axis extending through the center of the frame plate (48). (Likewise, the upper frame plate (60) contains recessed cavity hold areas.) When the lower and upper frame plates (48, 60) are assembled together, it is important the locator pins (54, 55, and 65) be close to the cavity holds (68, 69). This ensures positive mold cavity capture and reduces the likelihood of the cavities becoming dislodged from the frames. Any suitable retaining means such as, for example, a washer, O-ring, bolt, or screw may be used. The retaining means also helps maintain the mold cavities in a level position and prevents them from being disrupted during the molding cycle. The proximity of a locator pin (54, 55, 65) to the nearest cavity hold (68, 69) is defined by a proximity angle (θ), which is preferably ≤75 degrees, more preferably ≤50 degrees, and most preferably ≤30 degrees. In FIG. 8, the proximity angle of one locator pin (54) to the cavity hold (69) is 43 degrees. Meanwhile, the proximity angle of one locator pin (55) to the cavity hold (68) is 18 degrees.

Mold Cavities

Figure 9:
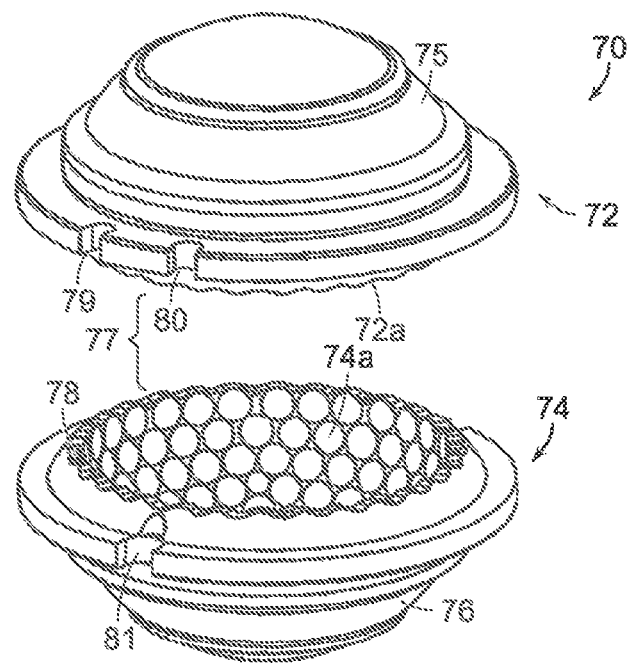
FIG. 9 is a perspective view of one embodiment of upper and lower mold cavities of the present invention.
Figure 9A:
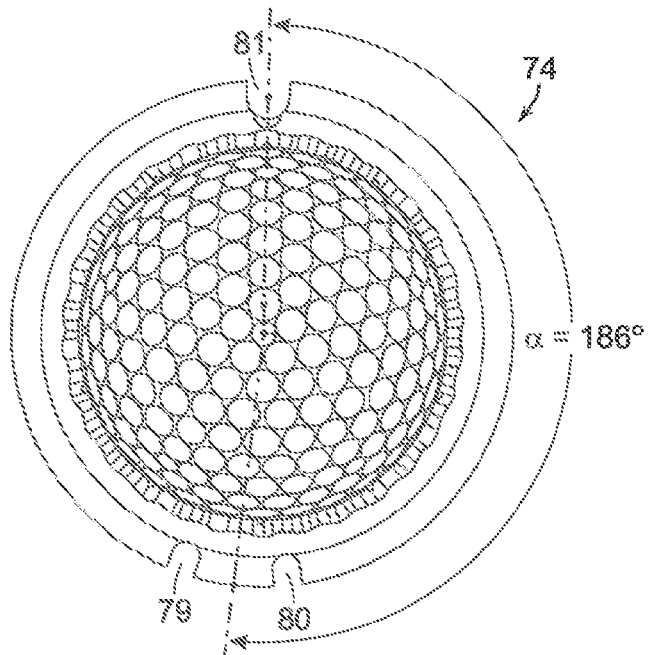
FIG. 9A is a planar view of the lower mold cavity shown in FIG. 9 showing the icosahedron-based dimple pattern of the cavity in detail.

Referring to the drawings showing the mold cavities, where like reference numerals are used to designate like elements, FIG. 9 shows one embodiment of a golf ball mold (70) of the present invention. The mold (70) comprises hemispherical-shaped mold cavities (72) and (74) having interior dimple patterns (72a) and (74a). Each mold cavity (72, 74) has an arcuate inner surface defining an inverted dimple pattern (72a, 74a). In FIGS. 9 and 9A, a modified-icosahedron geometrical pattern is used to form the dimple array. Other geometrical dimple patterns may be used in accordance with this invention as discussed further below. The mold cavities (72, 74) include hemispherical bases (75, 76) that are constructed so they fit into the recessed portions of the mold frames (48, 60). Preferably, the mold cavities are made from a metal material, for example, brass or silicon bronze. These metals provide the mold cavities with high durability, mechanical strength, and efficient thermal transfer. The metal mold cavities can withstand higher pressures and temperatures without deforming. When the mold cavities (72, 74) are joined together, they define an interior spherical cavity (77) that forms the cover for the ball. The castable cover material in the mold cavities adheres to the golf ball subassembly (not shown) to form a unitary one-piece cover structure. The cover material encapsulates the inner ball. Furthermore, the cover material conforms to the interior geometry (72a, 74a) of the mold cavities to form a dimple pattern on the surface of the ball. The mold cavities are mated together along a parting line (78) that creates an equator or seam for the finished ball. Different parting lines and dimple patterns that may be used to make the ball are discussed further below.

Figure 10:
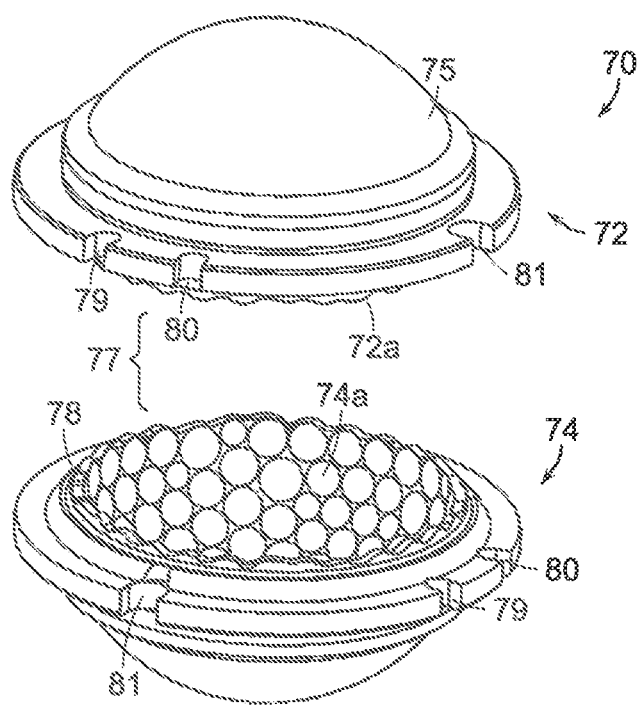
FIG. 10 is a perspective view of one embodiment of upper and lower mold cavities of the present invention.
Figure 10A:
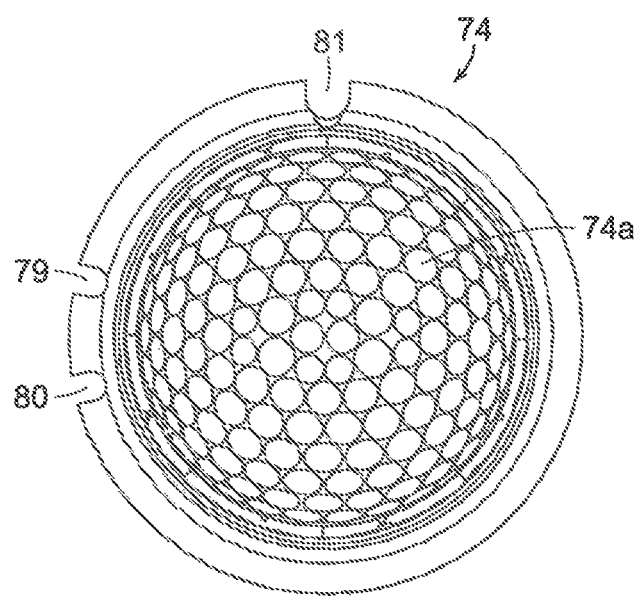
FIG. 10A is a planar view of the lower mold cavity shown in FIG. 10 showing the icosahedron-based dimple pattern of the cavity in detail.

Referring to FIG. 10A, the mold cavity (74) is shown in further detail. The mold cavity (74) includes a dimple arrangement and locator slots (79, 80, and 81) that fit over locator pins (54, 55, 65) on the mold frame plates (48, 60) when the mold cavity (74) is placed in the frame plate. The locator slots (79, 80, and 81) are separated by a rotation angle ($\alpha$), which is further discussed below. One key feature of the mold cavities (72, 74) of the present invention is that the cavities have identical designs. Thus, the "lower" mold cavity may be inserted into the lower or upper mold frame plate. In similar fashion, the "upper" mold cavity may be inserted into the lower or upper mold frame plate. Moreover, the mold cavities (72, 74) of this invention can be considered universal cavities that fit easily into and align properly with the mold frame. The mold cavities are universal for a given dimple pattern. The eccentric pin layout of the frame plates and corresponding slots in the cavities allows the operator in the production line to efficiently insert the universal mold cavities, for a given dimple layout, into the mold frame. That is, the mold frames can receive the universal mold cavities so that golf balls having a specific dimple pattern may be produced. The mold cavities are quickly fitted into the frame plates in proper alignment and mated as the upper and lower frame plates are brought together. The mold frame of this invention also can be considered a universal frame. Particularly, the frame has a robust structure with high mechanical integrity to accommodate mold cavities having different dimple layouts. The structure of the mold frame of this invention helps to minimize the likelihood of mold cavities being misaligned when they are inserted into the frame.

The mold cavities (72, 74) have a structure complementary to the mold frame plates (48, 60). This allows the mold cavities to be inserted easily into the frame plates. Particularly, the cavity should have a number of locator slots equal to the number of locator pins found in a set of given frame plates. The locator slots (79, 80, and 81) correspond to matching locator pins (54, 55, 65) in the frame plates. As the mold cavities (72, 74) are placed into the recessed portions of the frame plates (48, 60), the pins (54, 55, 65) in the mold frame slide into the slots (79, 80, and 81) of the mold cavities. In this manner, the mold cavities (72, 74) are locked in place.

More particularly, in FIG. 10A, the mold cavity (74a) includes two locator slots (79, 80) having a relatively small diameter. The locator pins (54, 55) in the lower frame plate (48), as described above, are intended to slide into the smaller sized locator slots (79, 80). Meanwhile, the single locator pin (65) in the upper frame plate (60) is intended to slide into the larger sized locator slot (81). That is, the locator slot (81) is over-sized and designed to slide over the over-sized single locator pin (65).

Each mold cavity (72, 74) preferably has two relatively small diameter locator slots having a diameter (ds). The diameter (ds) of the two locator slots (79, 80) and diameter (dp) of the two locator pins (54, 55) inserted into the two locator slots, as described above, may be defined according to the following relationship: $dp+0.001 \leq ds \leq dp+0.010$ (inches) and more preferably by: $dp+0.005 \leq ds \leq dp+0.008$ (inches).

In addition, each mold cavity (72, 74) preferably has a single relatively large diameter locator slot having a diameter (Ds). The diameter of the locator slot (Ds) and diameter of the locator pin (Dp) inserted into the locator slot, as described above, may be defined according to the following relationship: $Dp+0.001 \leq Ds \leq Dp+0.010$ (inches) and more preferably by the relationship: $Dp+0.005 \leq Ds \leq Dp+0.008$ (inches).

The angle between the two smaller locator slots (79, 80) is equal to the separation angle defined for the two smaller locator pins (54, 55) in the mold frame plate (48). In the mold cavities, the placement of the small slots (79, 80) and large slot (81) depends upon the dimple pattern geometry within the cavities. The angle between the large slot (81) (center of slot) and two smaller slots (79, 80) (line bisecting the two slots) is the desired rotation angle ($\alpha$). Preferably, the large slot (81) is separated from the two smaller slots (79, 80) to the largest extent as possible for a given dimple pattern. That is, the rotation angle ($\alpha$) in the mold cavity is maximized. In one version of the mold cavities of the present invention, the dimple pattern of each mold cavity is icosahedron-shaped and the rotation angle ($\alpha$) is 180 or 186 degrees (FIGS. 9 and 9A). In another version, the dimple pattern of each mold cavity (72, 74) is tetrahedron-shaped and the rotation angle ($\alpha$) is 90 degrees (FIGS. 10 and 10A).

Figure 11:
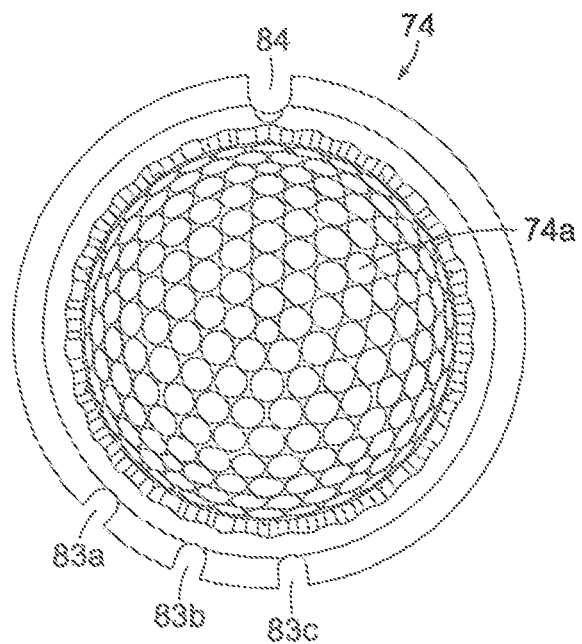
FIG. 11 is a planar view of one embodiment of a mold cavity of the present invention.
Figure 12:
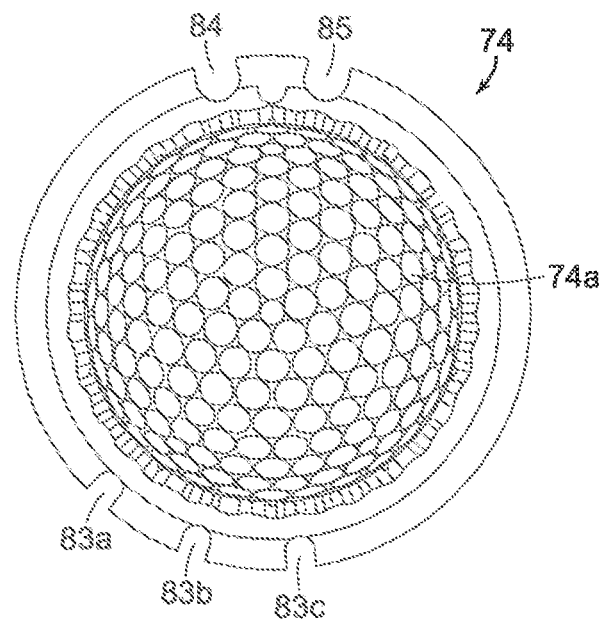
FIG. 12 is a planar view of one embodiment of a mold cavity of the present invention.
Figure 13:
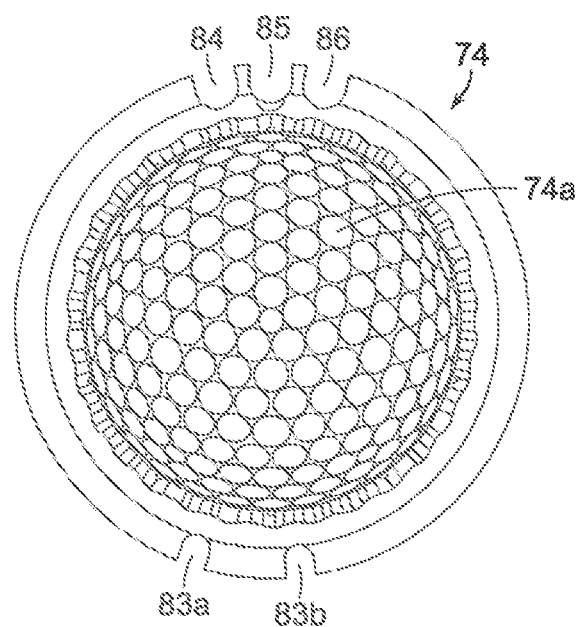
FIG. 13 is a planar view of one embodiment of a mold cavity of the present invention.

Referring to FIG. 11, another embodiment of a mold cavity (74) of the present invention is illustrated. The cavity includes three smaller-sized slots (83a, 83b, and 83c) and one larger-sized slot (84). The mold frame plates (not shown) used for housing these mold cavities would be modified accordingly. In this example, one mold cavity would include annular recesses equipped with three locator pins. The complementary mold cavity would include annular recesses equipped with a single locator pin. It should be recognized that various modifications to the mold cavities and frame plates may be made in accordance with this invention. For example, in FIG. 12, the mold cavity (74) includes three relatively small-sized locator slots (83a, 83b, and 83c) and two relatively large-sized locator slots (84, 85). In yet another version, the mold cavity in FIG. 13 includes two relatively small-sized locator slots (83a, 83b) and two relatively large-sized locator slots (84, 85, 86).

It is understood that the mold cavities and mold frames described and illustrated herein represent only some embodiments of the invention. It is appreciated by those skilled in the art that various changes and additions can be made to such cavities and frames without departing from the spirit and scope of this invention.

Molding Method

The cover may be formed around the golf ball sub-assembly by dispensing polymeric material into the mold cavities and mating them together under sufficient heat and pressure.

By the term, "subassembly" as used herein, it is meant the inner ball, that is the core and any intermediate layer(s) disposed between the core and outer cover layer. The core and intermediate layers are described in further detail below.

In the present invention, a castable polymeric material is used to form the outer cover of the golf ball. The polymeric material is in generally liquid form so that it can be dispensed into the mold cavities and molded over the golf ball subassembly. The molding process of this invention is suitable for making thin outer cover layers. Particularly, covers having a thickness of less than 0.05 inches can be made, more preferably in the range of 0.015 to 0.045 inches.

Suitable materials for forming the cover layer include, for example, polyurethanes; polyureas; copolymers and hybrids of polyurethane and polyurea; olefin-based copolymer ionomer resins (for example, Surlyn® ionomer resins and DuPont HPF® 1000 and HPF® 2000, commercially available from E. I. du Pont de Nemours and Company; Iotek® ionomers, commercially available from ExxonMobil Chemical Company; Amplify® 10 ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof.

Castable polyurethanes, polyureas, and copolymers, hybrids, and mixtures of polyurethanes-polyureas are of particular interest, because these materials can be used to make a golf ball having high resiliency and a soft feel. Balls having a high resiliency tend to reach a high velocity when struck by a golf club. As a result, the ball tends to travel a greater distance which is particularly important for driver shots off the tee. Meanwhile, the soft feel of the ball provides the player with a more pleasant sensation when he/she strikes the ball with the club. The player senses more control over the ball as the club face makes impact. In general, polyurethanes are produced by the reaction of a polyisocyanate with a polyol in the presence of a catalyst and other additives. The chain length of a polyurethane prepolymer is extended by reacting it with a curing agent, for example, hydroxyl-terminated compounds, polyamines, and mixtures thereof.

In one embodiment, a polyurethane prepolymer and curing agent can be mixed in a motorized mixer inside a mixing head by metering amounts of the curative and prepolymer through the feed lines. The preheated lower mold cavities can be filled with the reactive polyurethane and curing agent mixture. Likewise, the preheated upper mold cavities can be filled with the reactive mixture. The lower and upper mold cavities are filled with substantially the same amount of reactive mixture. After the reactive mixture has resided in the lower mold cavities for a sufficient time period, typically about 40 to about 100 seconds, the golf ball subassembly can be lowered at a controlled speed into the reacting mixture. Ball cups can hold the subassemblies by applying reduced pressure (or partial vacuum). After sufficient gelling (typically about 4 to about 12 seconds), the vacuum can be removed and the subassembly can be released. Then, the upper half-molds can be mated with the lower half-molds. An exothermic reaction occurs when the polyurethane prepolymer and curing agent are mixed and this continues until the material solidifies around the subassembly. The molded balls can then be cooled in the mold and removed when the molded cover layer is hard enough to be handled without deforming. This molding technique is described in the above-mentioned Hebert et al., U.S. Pat. No. 6,132,324 along with Wu, U.S. Pat. No. 5,334,673 and Brown et al., U.S. Pat. No. 5,006,297, the disclosures of which are hereby incorporated by reference.

Prior to forming the cover layer, the ball subassembly may be surface-treated to increase the adhesion between its outer surface and cover material. Examples of such surface-treatment may include mechanically or chemically abrading the outer surface of the subassembly. Additionally, the subassembly may be subjected to corona discharge, plasma treatment, silane dipping, or other chemical treatment methods known to those of ordinary skill in the art prior to forming the cover around it. Other layers of the ball, for example, the core and cover layers, also may be surface-treated. Examples of these and other surface-treatment techniques can be found in U.S. Pat. No. 6,315,915, the disclosure of which is hereby incorporated by reference.

A dispensing process as described in U.S. Pat. Nos. 7,655,171; 7,490,975; and 7,246,937, the disclosures of which are hereby incorporated by reference, can be used in accordance with the present invention. This process involves pumping the reactive polyurethane components into a mixer body and mixing them together with a dynamic mixer element. The components are heated to a temperature in the range of about 150° F. to about 350° F. as the components flow through a dispensing port, which dispenses the components into the lower and upper half-molds. The dispensing port moves into and out of the mold cavity by pneumatic pressure so the components are deposited uniformly into the half-molds.

In another embodiment, a conveyor belt system can be used for transporting the mold frames as described in co-assigned, co-pending, U.S. patent application Ser. No. 12/614,814, the disclosure of which is hereby incorporated by reference. In this system, the lower and upper frame plates containing the mold cavities are pre-heated to a temperature in the range of about 140° to about 165° F. Dispensing ports are used to inject the polyurethane mixture into the mold cavities. The upper mold frame plates containing the upper mold cavities are fed to a golf ball sub-assembly supply station, where the ball sub-assemblies are introduced into the cavities. The lower mold frame plates containing the lower mold cavities continue moving forward on the main conveyor belt line. At the next station, the upper and lower mold frame plates are fastened together.

Referring back to FIGS. 5-8, the mold cavities (72, 74) are placed in the annular recesses of the lower and upper mold frame plates (48, 60). The frame plate (48) further includes bores (75*a*, 75*b*, 75*c*, and 75*d*) for receiving fastening means such as bolts or screws (not shown) so the lower and upper plates (48, 60) can be clamped together. Alignment holes (76, 77) are located in corners of the frame plate. Guide pins (78, 79) in the upper frame plate (60) are inserted into the holes (76, 77) to facilitate attachment of the upper frame plate (60) to the lower frame plate (48). The upper plate (60) further includes bores (80*a*, 80*b*, 80*c*, and 80*d*) for receiving bolts or other fastening means. In this manner, the lower and upper plates (48, 60) can be fastened together. The threaded bolts (not shown) or other fastening means are inserted through the complementary axial bores (75*a-d*) and (80*a-d*) formed in each of the frame plates (48, 60). In this manner, the lower and upper plates (48, 60) are bolted together.

At the assembly head station, the upper and lower frame plates are clamped together, preferably by bolts which are threaded through the bores (75*a-d* and 80*a-d*) as described above, under pressure normally between about 400 to about 600 psi. After the mold frame is assembled, the frame is fed back to the main conveyor belt and carried to a curing tunnel.

Automated flippers grab the mold frames and reorient them so they stand in a vertical position prior to being introduced into the curing tunnel. This allows the system to maximize conveyor space and also achieve a higher degree of curing thermodynamics. The mold frames are then carried into the curing tunnel. Upon exiting the curing tunnel, the mold frames are pre-cooled on a meshed conveyor belt to allow directed air flow evenly over both upper and lower frame plates simultaneously. Then, the molds are fed into a tipping station, wherein they are reoriented to a horizontal position. The mold frames are then carried through a high efficiency chiller equipped with fans operated by zone control. After the mold frames have been chilled, the balls are de-molded by an automated in-line disassembly machine and then moved to a ball removal machine which automatically picks the golf balls out of the mold halves for further processing.

After the golf balls have been removed from the mold, they may be subjected to finishing steps such as flash trimming, surface-treatment, marking, coating, and the like using techniques known in the art.

For example, one technique involves using a white-pigmented material such as polyurethane, polyurea, or the like to form the cover as described above. The cover is surface-treated using a suitable method such as, for example, corona treatment, plasma treatment, UV treatment, flame treatment, or electron beam treatment. Trademarks, symbols, logos, letters, numerals, and other indicia may be printed on the ball's cover using pad-printing, ink-jet printing, dye sublimation, or other suitable printing methods. Then, clear surface coatings (for example, primer and top-coats), which may contain a fluorescent whitening agent, are applied to the cover. Suitable materials that can be used as such surface coatings include, for example, urethanes, urethane hybrids, epoxies, polyesters and acrylics. The resulting golf ball has a glossy and durable surface finish.

In another finishing process, the golf balls are painted with one or more paint coatings. For example, a white primer paint may be applied first to the surface of the ball and then a white top-coat of paint may be applied over the primer. Of course, the golf ball may be painted with other colors, for example, reds, blues, and yellows. As noted above, markings such as trademarks and logos may be applied to the painted cover of the golf ball. Finally, a clear surface coating may be applied to the cover to provide a shiny appearance and protect the printed indicia.

As discussed above, the core and intermediate layer(s) constitute the sub-assembly of the ball or inner ball which is encapsulated by the cover material. The core and intermediate layers may be made of a wide variety of materials.

Dimple Patterns

As discussed above, the lower and upper mold cavities (48, 60) have interior dimple cavity details (48*a*) and (60*a*). When the mold cavities are mated together, they define an interior spherical cavity that forms the cover for the ball. The cover material encapsulates the inner ball subassembly to form a unitary, one-piece cover structure. Furthermore, the cover material conforms to the interior geometry of the mold cavities to form a dimple pattern on the surface of the ball. The mold cavities may have any suitable dimple arrangement such as, for example, icosahedral, octahedral, cube-octahedral, dipyramid, and the like. In addition, the dimples may be circular, oval, triangular, square, pentagonal, hexagonal, heptagonal, octagonal, and the like. Possible cross-sectional shapes include, but are not limited to, circular arc, truncated cone, flattened trapezoid, and profiles defined by a parabolic curve, ellipse, semi-spherical curve, saucer-shaped curve, sine or catenary curve, or conical curve. Other possible dimple designs include dimples within dimples, constant depth dimples, or multi-lobe dimples, as disclosed in U.S. Pat. No. 6,749,525. It also should be understood that more than one shape or type of dimple may be used on a single ball, if desired.

The use of various dimple patterns and profiles provides a relatively effective way to modify the aerodynamic characteristics of a golf ball. Suitable dimple patterns include, for example, icosahedron-based pattern, as described in U.S. Pat. No. 4,560,168; octahedral-based dimple patterns as described in U.S. Pat. No. 4,960,281; and tetrahedron-based patterns as described in co-assigned, co-pending, U.S. patent application Ser. No. 12/894,827, the disclosure of which is hereby incorporated by reference. Other tetrahedron-based dimple designs are shown in co-assigned, co-pending design applications D 29/362,123; D 29/362,124; D 29/362,125; and D 29/362,126, the disclosures of which are hereby incorporated by reference.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have dimple coverage of at least about 75 percent or greater, about 80 percent or greater, or even about 85 percent or greater.

In an alternative embodiment, the golf ball may have a non-planar parting line allowing for some of the plurality of dimples or projections to be disposed about the equator. In one embodiment, the upper and lower mold cavities each have non-planar parting surfaces and are staggered such that each surface comprises a plurality of peaks and valleys that constitute the staggered parting line's amplitude as described in the above-mentioned Nardacci et al., U.S. Pat. No. 7,618,333, the disclosure of which is hereby incorporated by reference. In another embodiment, the parting line visibility is minimized by arranging the dimples in a pattern derived from at least one irregular domain generated from a regular or non-regular polyhedron as disclosed in co-assigned, co-pending U.S. patent application Ser. No. 12/262,464, the disclosure of which is hereby incorporated by reference. In another embodiment, a golf ball having multiple sets of identical hemispheres created by multiple symmetrical parting lines can be formed as disclosed in U.S. patent application Ser. No. 12/838,846, the disclosure of which is hereby incorporated by reference.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 300-360 dimples. In one embodiment, the dimple count on the ball is about 360-400 dimples.

It should be understood that the mold frames and cavities described and illustrated herein represent only presently preferred embodiments of the invention. It is appreciated by those skilled in the art that various changes and additions can be made to such mold frames and cavities without departing from the spirit and scope of this invention. It is intended that all such embodiments be covered by the appended claims.

We claim:

1. A golf ball mold frame, comprising
a lower plate containing multiple annular recesses for holding mold cavities, each recess having at least two locator pins arranged on a rim for inserting into corresponding locator slots of a mold cavity; the two locator pins being arranged symmetrically about an axis intersecting the center of the annular recesses; and
an upper plate containing multiple annular recesses for holding mold cavities, each recess having at least one locator pin arranged on a rim for inserting into at least one corresponding locator slot of a mold cavity; the at least one locator pin being positioned on the same axis where the two locator pins in the lower frame plate are positioned, the upper plate and lower plate including a fastening means so that when the lower and upper mold frames are brought into contact with each other, the mold cavities in the lower frame are mated to the mold frames in the upper frame under compressive force.

2. The frame of claim 1, wherein the lower and upper frame plates are substantially square-shaped and each plate contains four annular recesses for receiving four mold cavities.

3. The frame of claim 1, wherein each annular recess in the lower frame has two locator pins arranged on its rim and each annular recess in the upper mold frame has a single locator pin arranged on its rim.

4. The frame of claim 3, wherein the two locator pins are positioned symmetrically about a first axis that intersects the center of the annular recesses in the lower frame plate, and the single locator pin is positioned on a second axis that intersects the annular recesses in the upper frame plate, the first and second axes being identical.

5. The frame of claim 4, wherein the two locator pins have the same diameter, each pin having a diameter of $\leq 0.125$ inches.

6. The frame of claim 5, wherein the relationship of the diameter of the two locator pins (dp) and diameter of the single locator pin (Dp) is defined according to the following relationship:

$$dp < Dp \leq 1.25 dp.$$

7. The frame of claim 4, wherein the two locator pins are separated by a separation angle in the range of about 10 to about 45 degrees.

8. The frame of claim 1, wherein each mold frame plate contains two cut-out cavity hold areas for placing retaining means to secure the mold cavities in place, the cut-out areas being located on an axis extending through the center of each frame plate.

9. The frame of claim 8, wherein the position of a locator pin to an adjacent cavity hold area is defined by a proximity angle of less than 75 degrees.

10. The frame of claim 1, wherein a retainer washer is positioned between the lower and upper frame plates to secure the mold cavities in place as the plates are pressed together.

11. The frame of claim 1, wherein the lower plate has at least one alignment hole for receiving a guide pin and the upper plate has at least one guide pin for inserting into the at least one alignment hole when the lower and upper frame frames are brought into contact with each other.

* * * * *